United States Patent
Faltin et al.

(10) Patent No.: US 12,001,425 B2
(45) Date of Patent: Jun. 4, 2024

(54) DUPLICATION ELIMINATION IN DEPTH BASED SEARCHES FOR DISTRIBUTED SYSTEMS

(71) Applicant: Oracle International Corporation, Redwood Shores, CA (US)

(72) Inventors: Tomas Faltin, Prague (CZ); Vasileios Trigonakis, Zurich (CH); Jean-Pierre Lozi, Zurich (CH); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 429 days.

(21) Appl. No.: 17/116,831

(22) Filed: Dec. 9, 2020

(65) Prior Publication Data
US 2022/0179859 A1    Jun. 9, 2022

(51) Int. Cl.
*G06F 16/2452* (2019.01)
*G06F 16/2455* (2019.01)
*G06F 16/248* (2019.01)

(52) U.S. Cl.
CPC .. *G06F 16/24526* (2019.01); *G06F 16/24556* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 6,092,062 | A | 7/2000 | Lohman |
| 8,234,233 | B2 | 7/2012 | Zhou |

(Continued)

FOREIGN PATENT DOCUMENTS

| | | |
|---|---|---|
| CN | 110427359 A | 11/2019 |
| CN | 110609911 A | 12/2019 |

(Continued)

OTHER PUBLICATIONS

Erhard Rahm ("Scalable Graph Analytics," Year 2017 (Year: 2017).*

(Continued)

*Primary Examiner* — Yu Zhao
(74) *Attorney, Agent, or Firm* — Hickman Becker Bingham Ledesma LLP

(57) ABSTRACT

Systems and methods for improving evaluation of graph queries through depth first traversals are described herein. In an embodiment, a multi-node system evaluates against graph data a graph query that specifies a particular pattern to match by determining, at a first node of the multi-node system, in a particular instance of evaluating the graph query, that one or more first vertices on the first node match a first portion of the graph query and that a second vertex that is to be evaluated next is stored on a second node separate from the first node. In response to determining that the next vertex to be evaluated is stored on the second node separate from the first node, the first node generates a message to the second node comprising one or more results of the first portion of the graph query based on the one or more first vertices, an identifier of the next vertex, and a current stage of evaluating the graph query. In response to generating the message from the first node to the second node, the first node ceases the particular instance of evaluating the graph query.

18 Claims, 8 Drawing Sheets

(56) References Cited

U.S. PATENT DOCUMENTS

| | | |
|---|---|---|
| 8,543,517 B2 | 9/2013 | Shotton |
| 9,135,565 B1 | 9/2015 | Khalefa |
| 9,165,283 B2 | 10/2015 | Scheidl et al. |
| 10,445,319 B2 | 10/2019 | Weld |
| 2005/0015511 A1 | 1/2005 | Izmailov |
| 2006/0256797 A1 | 11/2006 | Bernabeu-Auban et al. |
| 2012/0109889 A1 | 5/2012 | Wu |
| 2012/0209886 A1* | 8/2012 | Henderson .......... G06F 16/9024 707/E17.011 |
| 2015/0089514 A1* | 3/2015 | Grewal ................... G06F 9/546 719/318 |
| 2015/0261817 A1 | 9/2015 | Harris |
| 2016/0306896 A1 | 10/2016 | Paradies |
| 2017/0004005 A1 | 1/2017 | Elliott et al. |
| 2017/0091246 A1* | 3/2017 | Risvik ................. G06F 16/2471 |
| 2017/0118042 A1 | 4/2017 | Bhattacharya |
| 2017/0139991 A1* | 5/2017 | Teletia ................ G06F 16/9024 |
| 2017/0147644 A1 | 5/2017 | Lee |
| 2017/0177870 A1 | 6/2017 | Hildebrand |
| 2018/0329958 A1* | 11/2018 | Choudhury ......... G06F 16/2456 |
| 2019/0057539 A1 | 2/2019 | Stanard et al. |
| 2019/0205178 A1 | 7/2019 | Lee et al. |
| 2019/0370695 A1 | 12/2019 | Chandwani |
| 2020/0117762 A1 | 4/2020 | Haprian et al. |
| 2020/0380032 A1* | 12/2020 | Wills .................... G06F 16/902 |
| 2020/0401625 A1* | 12/2020 | Wright ................ G06F 16/9024 |
| 2021/0089580 A1 | 3/2021 | Deng |
| 2021/0110508 A1 | 4/2021 | Mellempudi et al. |
| 2021/0216590 A1 | 7/2021 | Delamare |
| 2021/0240705 A1 | 8/2021 | Trigonakis |
| 2021/0365457 A1* | 11/2021 | Venema .............. G06F 16/2448 |
| 2021/0373938 A1 | 12/2021 | Koupy |
| 2021/0383600 A1 | 12/2021 | Uhrenholt et al. |
| 2021/0392073 A1 | 12/2021 | Tonkovic et al. |

FOREIGN PATENT DOCUMENTS

| | | |
|---|---|---|
| JP | 2016106329 A | 6/2016 |
| WO | WO2019218814 A1 | 11/2019 |

OTHER PUBLICATIONS

Holzschuher et al. ("Querying a graph database—language selection and performance considerations," Year 2015 (Year: 2015).*

Trigonakis, U.S. Appl. No. 16/778,668, filed Jan. 31, 2020, Final Rejection, dated Apr. 8, 2022.

Ma et al., "G-SQL: Fast Query Processing via Graph Exploration", Proceedings of the VLDB Endowment, vol. 9, No. 12, DOI: 2150-8097/16/08, dated 2016, 12 pages.

Azure Cosmos DB, "Fast NoSQL Database with Open APIs for any Scale", https://azure.microsoft.com/en-gb/services/cosmos-db, dated 2018, 20 pages.

Boncz et al., Breaking the Memory Wall in MonetDB, Communications of the ACM, vol. 15, No. 12, dated Dec. 2008, 9 pages.

Buleon, "OrientDB—The Multi-Model and Graph Database", Info-H-415: Advanced Databases, http://orientdb.com/docs/last/index.html, dated 2017, 20 pages.

Chen et al., G-Minor: An Efficient Task-Oriented Graph Mining System ▫, EuroSys 2018, Association for Computing Machinery, https://doi.org/10.1145/3190508.3190545, dated Apr. 2018, 12 pages.

Dave et al., GraphFrames: An Integrated API for Mixing Graph and Relational Queries, GRADES 2016, DOI: http://dx.doi.org/10.1145/2960414.2960416, dated Jun. 2016, 8 pages.

David et al., "Asynchronized Concurrency: The Secret to Scaling Concurrent Search Data Structures", ASPLOS 2015, http://dx.doi.org/10.1145/2694344.2694359, dated Mar. 2015, 14 pages.

Dubey et al., "Weaver: A High-Performance, Transactional Graph Database Based on Refinable Timestamps", Proceedings of the VLDB Endowment, vol. 9, No. 11, https://arxiv.org/pdf/1509.08443.pdf, dated 2016, 12 pages.

Hong et al., "PGX.D: A Fast Distributed Graph Processing Engine", High Performance Computing, Networking and Storage Conference, SC 2015, DOI: http://dx.org/10.1145/2807591.2807620, dated Nov. 2015, 12 pages.

Iyer et al., "ASAP: Fast, Approximate Graph Pattern Mining at Scale", Proceedings of the 13th USENIX Symposium on Operating Systems Design and Implementation, https://www.usenix.org/conference/osdi18/presentation/iyer, dated Oct. 2018, 18 pages.

Kankanamge et al., "Graphflow: An Active Graph Database", SIGMOD 2017, DOI: http://dx.doi.org/10.1145/3035918.3056445, dated May 2017, 4 pages.

Khandelwal et al., "ZipG: A Memory-Efficient Graph Store for Interactive Queries", SIGMOD 2017, DOI: http://dx.doi.org/10.1145/3035918.3064012, dated May 2017, 16 pages.

Kim et al., "TurboFlux: A Fast Continuous Subgraph Matching System for Streaming Graph Data", SIGMOD 2018, DOI: https://doi.org/10.1145/3183713.3196917, dated Jun. 2018, 16 pages.

Abdelaziz et al.,"Combining Vertex-Centric Graph Processing with SPARQL for Large-Scale RDF Data Analytics", IEEE Transactions on Parallel and Distributed Systems, http://dx.doi.org/10.1109/TPDS.2017.2720174, dated 2017, 15 pages.

Lumsdaine et al., "Challenges in Parallel Graph Processing", World Scientific Publishing Company, Parallel Processing Letters, dated Jan. 2007, 16 pages.

Zaharia et al., "Resilient Distributed Datasets: A Fault-Tolerant Abstraction for In-Memory Cluster Computing", 9th USENIX Symposium on Networked Systems Design and Implementation, dated Apr. 2012, 14 pages.

Microsoft Graph Engine, "Graph Engine: Serving Big Graphs in Real-Time", https://www.graphengine.io, dated 2017, 2 pages.

Müller, "Engineering Aggregation Operators for Relational In-Memory Database Systems", Karlsruhe Institute of Technology, Germany, dated 2016, 197 pages.

Openquery.com, "OQGRAPH Engine for MariaDB", https://openquery.com.au/products/graph-engine, dated Apr. 2008, 4 pages.

Page et al., "The PageRank Citation Ranking: Bringing Order to the Web", http://ilpubs.stanford.edu:8090/422/1/1999-66.pdf, dated Jan. 1998, 17 pages.

Sarwat et al., "Horton+: A Distributed System for Processing Declarative Reachability Queries over Partitioned Graphs", Proceedings of the VLDB Endowment, vol. 6, No. 14, https://dl.acm.org/doi/abs/10.14778/2556549.2556573, dated Aug. 2013, 12 pages.

Shao et al., "Trinity Graph Engine and its Applications", Bulletin of the IEEE Computer Society Technical Committee on Data Engineering, https://www.graphengine.io/downloads/papers/TrinityAndApps.pdf, dated 2017, 12 pages.

Shao et al., "Trinity: A Distributed Graph Engine on a Memory Cloud", SIGMOD 2013, https://dl.acm.org/doi/abs/10.1145/2463676.2467799, dated Jun. 2013, 12 pages.

Sharma, "Dragon: A Distributed Graph Query Engine", Facebook Engineering, https://code.fb.com/datainfrastructure/dragon-a-distributed-graph-query-engine, dated Mar. 2016, 7 pages.

Spyropoulos et al., "Digree: Building a Distributed Graph Processing Engine out of Single-Node Graph Database Installations", SIGMOD Record—vol. 46, No. 4, https://dl.acm.org/doi/abs/10.1145/3186549.3186555, dated 2017, 6 pages.

The Linux Foundation, "JanusGraph", https://docs.janusgraph.org, dated 2020, 3 pages.

Titan.thinkaurelius.com, Chapter 3: Getting Started, s3.thinkaurelius.com/docs/titan/1.0.0/getting-started.html, dated 2015, 8 pages.

Virtuoso Universal Server, "Data-Driven Agility without Compromise", http://virtuoso.openlinksw.com, dated 2019, 10 pages.

Yan et al., "A General-Purpose Query-Centric Framework for Querying Big Graphs", Proceedings of the VLDB Endowment, vol. 9, No. 7, https://dl.acm.org/doi/abs/10.14778/2904483.2904488, dated 2016, 12 pages.

Labouseur et al., "The G* Graph Database: Efficiently Managing Large Distributed Dynamic Graphs", Springer Science+Business Media, Distrib Parallel Databases, DOI: 10.1007/s10619-014-7140-3, dated Mar. 2014, 36 pages.

Trigonakis, U.S. Appl. No. 16/778,668, filed Jan. 31, 2020, Non-Final Rejection, dated Oct. 1, 2021.

Delamare, U.S. Appl. No. 16/738,972, filed Jan. 9, 2020, Notice of Allowance and Fees Due, dated Oct. 4, 2021.

(56) References Cited

OTHER PUBLICATIONS

Delamare, U.S. Appl. No. 16/738,972, filed Jan. 9, 2020, Notice of Allowance and Fees Due, dated Nov. 10, 2021.
Trigonakis, U.S. Appl. No. 16/778,668, filed Jan. 31, 2020, Advisory Action, dated Jun. 30, 2022.
Tonkovic, U.S. Appl. No. 16/899,185, filed Jun. 11, 2020, Notice of Allowance and Fees Due, dated Jun. 2, 2022.
Koupy, U.S. Appl. No. 16/883,317, filed May 26, 2020, Notice of Allowance and Fees Due, dated May 27, 2022.
Riggan, Taylor, et al., "Using SPARQL explain to understand query execution in Amazon Neptune", AWS Database Blog, https://aws.amazon.com/blogs/database/using-sparql-explain-to-understand-query-execution-in-amazon-neptune/, Sep. 17, 2019, 10pgs.
Amazon Neptune Features, www.aws.amazon.com/neptune/features/, printed on Oct. 7, 2021, 8 pages.
Databricks, "Graph Analysis Tutorial With GraphFrames", dated Mar. 17, 2019, 2 pages.
18C Oracle, "Spatial and Graph Analytics with Oracle Database 18c", White Paper, dated Feb. 2018, 32 pages.
Jin et al., "3-HOP: A High Compression Indexing Scheme for Reachability Query", SIGMOD'09, Jun. 29-Jul. 2, 2009, Providence, Rhode Island, USA, 14 pages.
Ingalls et al., "Eliminating Canceling Edges From the Simulation Graph Model Methodology", Proceedings of the 1996 Winter Simulation Confrence, dated 1996, 8 pages.
Hodler et al., "An Overview of Graph Algorithms in Neo4j", Neo4j, White Paper, dated 2018, 10 pages.
Harris, Tim, "Callisto-RTS: Fine-Grain Parallel Loops", dated Jul. 2015, 13 pages.
Gonzalez et al., "GraphX: Graph Processing in a Distributed Dataflow Framework", dated 2014, 15 pages.
Lyu et al., "DBL: Reachability Queries on Dynamic Graphs", Technical Report, dated Jan. 4, 2019, 27 pages.
Dekel et al., "Cachesensitive Optimization of Immutable Graph Taversals (CS745 Project Report)", ACM, dated 2015, 9 pages.
Morishima et al., "Performance Evaluations of Graph Database using CUDA and OpenMP Compatible Libraries", ACM SIGARCH Computer Architecture News, dated Jun. 2014, 6 pages.
Cong et al., "Solving Large, Irregular Graph Problems using Adaptive Work-stealing", dated 2008, 10 pages.
ArangoDB, "Distributed Iterative Graph Processing", dated Feb. 17, 2020, 8 pages.
Apache Spark, "GraphX", Spark 2.3.4 released (/news/spark-2-3-4-released.html), dated Sep. 9, 2019, 3 pages.
Amazon Neptune, Fast Reliable Graph Database Built for the Cloud, www.aes.amazon.com/neptune, last viewed on Jun. 16, 2020, 16 pages.
Amazon Neptune, "Overview", https://aws.amazon.com/neptune/, last viewed on Mar. 9, 2020, 16 pages.
Amazon Neptune "Features", https://aws.amazon.com/neptune/, 8 pages, last viewed on Mar. 9, 2020.
Adcock et al., "Evaluating OpenMP Tasking at Scale for the Computation of Graph Hyperbolicity", IWOMP dated 2013, 13 pages.
Elshawi et al., "Big Graph Processing Systems: State-of-the-art and Open Challenges", dated 2015 IEEE First International Conference on Big Data Computing Service and Applications, 10 pages.
Roth et al., "PGX.D/Async: A Scalable Distributed Graph Pattern Matching Engine", dated 2017 Publication rights licensed to ACM, 6 pages,.
Viehmann et al., "Introduction to Graph Analytics and Oracle Cloud Service", dated Oct. 22, 2018, 43 pages.
Tigergraph's Native Parallel Graph, dated 2020, 2 pages.
Tiger Graph, "Cool Vendor in Data Management", Advanced Analytics on Connected Data, dated 2020, 3 pages.
Tada et al., "On the Robustness of the Soft State for Task Scheduling in Large-scale Distributed Computing Environment", IEEE, dated 2008, 7 pages.
Spark 2.4.5, "GraphX Programming Guide", dated Apr. 1, 2020, 23 pages.
Salihoglu et al. "GPS: A Graph Processing System", SSDBM: Proceedings of the 25th International Conference on Scientific and Statistical Database Management, dated Jul. 2013, 31 pages.
Low et al. "GraphLab: A New Framework for Parallel Machine Learning", dated 2014, 10 pages.
Rowe, Walker, BMC blogs, "Introduction to the Neo4j Graph Database", Mar. 21, 2019, https://www.bmc.com/blogs/neo4j-graph-database/, 19pgs.
Zhang et al., "REGTT: Accelerating Tree Traversals on GPUs by Exploiting Regularities", dated 2016, 10 pages.
Rest, Oskar van et al., "PGQL: a Property Graph Query Lanuage", ACM, dated 2016, 6 pages.
Priya et al., "A Survey on Realizing Memory-Optimized Distributed Graph Processing", IOSR Journal of Engineering (IOSRJEN), vol. 8, Issue 8 dated Aug. 2018, 7 pages.
PGQL, "Property Graph Query Language", Oracle, dated 2019, 5 pages.
PGQL 1.2 Specification, "Property Graph Query Language", dated Feb. 20, 2019, 79 pages.
Oracle, "Oracle Big Data Appliance X7-2", dated 2017, 10 pages.
Neo4j, "Neo4j Graph Platform", https://neo4j.com, last viewed on Jun. 17, 2020, 14 pages.
Neo4j, "Graph and Machine Learning Algorithms", dated 2019, 9 pages.
Sakr et al., "Large Scale Graph Processing Using Apache Giraph", dated Mar. 20, 2017, 244 pages.
Trigonakis, U.S. Appl. No. 16/778,668, filed Jan. 31, 2020, Notice of Allowance and Fees Due, dated Feb. 3, 2023.
Trigonakis, U.S. Appl. No. 16/778,668, filed Jan. 31, 2020, Non-Final Rejection, dated Aug. 24, 2022.

\* cited by examiner

502 Determine, at a First Node of a Multi-Node Computing System, in a Particular Instance of Evaluating a Graph Query, That One or More Vertices on the First Node Match a First Portion of the Graph Query and That a Second Vertex that is to be Evaluated Next is Stored on a Second Node Separate from the First Node

504 In Response to Determining That the Next Vertex to be Evaluated is Stored on the Second Node Separate from the First Node, Generate a Message from the First Node to the Second Node Comprising One or More Results of the First Portion of the Graph Query Based on the One or More First Vertices, an Identifier of the Second Vertex, and a Current Stage of Evaluating the Graph Query

506 Determine, in a Second Instance of Evaluating the Graph Query, That One or More Third Vertices on the First Node Match the First Portion of the Graph Query and That a Fourth Vertex to be Evaluated Next is a Same Vertex as the Second Vertex

508 In Response to Determining That the One or More Third Vertices Match the First Portion of the Graph and That the Fourth Vertex is the Same Vertex as the Second Vertex, Add One or More Second Results of the First Portion of the Graph Query Based on the One or More Third Vertices to the Message

510 In Response to Generating the Message From the First Node to the Second Node, the First Node Ceasing the Particular Instance of Evaluating the Graph Query

FIG. 5

DUPLICATION ELIMINATION IN DEPTH BASED SEARCHES FOR DISTRIBUTED SYSTEMS

FIELD OF THE INVENTION

The present invention relates to querying graph database data and, more specifically, to optimizing in-memory execution of graph data queries by performing duplication elimination during depth first traversals to reduce the amount of memory needed to perform query execution.

BACKGROUND

Graph processing is an important tool for data analytics in which fine-grained relationships between data entities are materialized, in a graph database, as graph edges (or simply "edges") between graph vertices (or simply "vertices"). Information about the entities, represented by vertices, and information about relationships between the entities, represented by edges, may be queried and analyzed to gain insights into the represented data.

Graph processing consists of two main approaches: (a) analytics/algorithms, and (b) pattern-matching queries. A graph algorithm, such as PageRank, iteratively explores graph data to identify information encoded in the graph, and can aggregate the identified information. In contrast, pattern-matching queries provide an interface for interactive exploration of graphs similar to what structured query language (SQL) offers for relational databases, with a focus on exploring connections in the data. For simplicity, the term "graph queries" herein refers to graph querying and pattern matching. While graph analytics have been heavily researched, graph queries have attracted far less attention. Nevertheless, graph queries are a very important tool for industry, as indicated by the large number of available graph query engines and languages.

Pattern matching refers to finding patterns in target graph data that are homomorphic to a target path pattern, such as a triangle. In addition to the structural pattern, projections, filters, property accesses, etc., can be added to a graph query (similar to SQL). Herein, graph queries are represented using property graph query language (PGQL), which is a graph query language with a syntax close to SQL. (Additional information about PGQL can be found in "PGQL: a Property Graph Query Language", by Oskar van Rest et al., GRADES 2016, Jun. 24, 2016, the entire contents of which is incorporated by reference as if fully set forth herein.) To illustrate, the following PGQL query counts the number of authors, in target graph data, that "like" each other.

SELECT COUNT(*) MATCH (p1:author)-[:likes]→(p2: author), (p2)-[:likes]→(p1)

Graph queries are a challenging workload because they focus on connections in the data. By following edges, graph query execution explores large parts of the graph, generating large intermediate and final result sets, thereby reflecting a combinatorial explosion effect. For example, on the well-researched Twitter graph, a single-edge query (i.e., (v0)→(v1)) matches the whole graph, counting 1.4 billion results. A two-edge query (i.e., (v0)→(v1)→(v2)) on the Twitter graph illustrates the combinatorial explosion effect in that this query returns about nine trillion matches. Unlike graph queries, most graph algorithms do not usually manifest the combinatorial explosion effect as they operate in rounds, accessing the one-hop neighbors at every iteration.

Additionally, graph queries can exhibit extremely irregular access patterns and therefore require low-latency data access. Therefore, because of the required random accesses and resulting missing spatial locality, the traditional approach of 'disk-based with an in-memory cache' of relational databases is not well suited for graph queries. For this reason, high-performance graph query engines attempt to keep data in main memory and scale out to a distributed system in order to handle graphs that exceed the capacity of a single node.

Executing graph queries is even more challenging when the number of results, including intermediate results, becomes large. Very large intermediate and final result sets generally occur when at least one of two scenarios stands: (a) the graph data targeted by the query is large, e.g., a social network; or (b) the query itself defines a long pattern and/or is expected to have a large number of results (e.g., counting cycles (a)→(b)→(c)→(d)→(a)).

Graph databases may be implemented by single-node database systems, multi-node shared-memory database systems, multi-node distributed-memory database systems, multi-tenant database systems, etc. In the context of distributed graph database systems, graph data is typically partitioned across machines, with a set of vertices and the edges connecting those vertices residing in each machine. For example, FIG. 1 depicts a 5-vertex graph database 100 that is partitioned across a computing device 110 (which maintains database data 102) and a computing device 140 (which maintains database data 104). As referred to herein, a computing device "owns" data that is maintained by a database server instance running on the device. Thus, the vertices and edges defined in database data 102 are "owned" by computing device 110, and the vertices and edges defined in database data 104 are "owned" by computing device 140.

According to a non-limiting embodiment, an edge is owned by the machine that owns the source vertex of the edge. The owner of an edge maintains an identifier of a destination vertex of the edge, and an identifier of the owner of the destination vertex, as well as any properties of the edge. Thus, device 110 "owns" vertices v0, v1, and v2 and edges 112, 114, 116, 118, 120, and 122. Further, device 140 "owns" vertices v3 and v4 and edge 126. "Reverse" edge information may also be maintained by the owner of the destination vertex of the edge, where the reverse edge information includes an identifier of the source vertex of the edge and an identifier of the owner of the source vertex.

With respect to the example data depicted in FIG. 1, matching (v0)→(v1) can happen locally at device 110 (i.e., matching local edge 112), while matching (v2)→(v3) requires remote communication between device 110 and device 140 (i.e., matching remote edge 124). Naturally, remote edges are more expensive to match than local edges because of inter-machine communication required to perform remote edge matching. Such communication subjects query execution to network latencies, which generally represent a bottleneck for query execution.

In a single-node graph database system, BFS-based query execution can have important performance benefits due to locality, however, large graphs and queries can still cause memory consumption issues because of the need to maintain large intermediate result sets. Distributed database management systems (DBMSs) could handle the problem of maintaining large intermediate result sets, in-memory, for a query over a very large set of graph data by adding more machines. If the distributed DBMS scales well, adding machines to a distributed system increases the size of memory that is usable by the system, resulting in the system being able to serve larger computations. However, adding machines to a distributed system is expensive and does not address the combinatorial explosion effect for graph query results, but rather moves the limitation of the distributed DBMS in an attempt to avoid the problems resulting from combinatorial explosion. Furthermore, distribution of the data across nodes of a distributed DBMS exacerbates the problem of limited locality during query execution.

Another approach to address the problem of handling large intermediate results, caused by either a large dataset or a complicated query pattern, is utilizing offloading of intermediate results to disk, as performed by relational database systems and adopted by some modern graph database systems, such as Apache Spark GraphFrames. Specifically, intermediate results for graph queries are stored in a fixed amount of memory, and when there is not enough memory for additional intermediate results being produced by query execution, the system off-loads portions of the intermediate result set/computation to disk. In this way, additional required query computation may continue in the freed memory. However, this approach leads to large performance degradation, when compared to in-memory-only query execution, due to the need to serve data from the disk to access intermediate results and/or to continue computations required for the query.

Graph database systems generally use one of the following approaches to perform graph traversal required for query execution—(a) breadth-first search (BFS)-based traversal or (b) depth-first search (DFS)-based traversal.

Breadth First Search-Based Traversal

BFS is the most common runtime technique used by many graph database systems, e.g., Apache Spark GraphFrames, Neo4j, etc. To illustrate BFS-based traversal techniques as part of execution of a graph query, a database server instance applies the query pattern (a)→(b)→(c) against graph database 100 (FIG. 1) using BFS-based techniques. FIG. 2 depicts three stages 210, 220, and 230 of path pattern matching using BFS-based techniques. Specifically, at stage 210, the database server instance matches all possible vertices in database 100 to the (a) vertex of the query path pattern. At stage 220, the database server instance expands the results produced in stage 210 (matching vertex (b) of the query path pattern) to calculate all possible vertex paths through database 100 to match the portion of the query path pattern (a)→(b). Finally, at stage 230 (matching vertex (c) of the query path pattern), the database server instance generates a complete listing of matches to (a)→(b)→(c) in database 100.

BFS-based traversal techniques have several benefits for graph query execution, including being very simple to implement. BFS is also easy to parallelize. Specifically, after every stage of query execution, the set of intermediate results can be split and allocated to different processing entities (e.g., threads running on devices 110 and 140) performing the computation. Further, BFS-based query execution is able to take advantage of any locality in the graph data as the data is stored in memory. For example, it is common that edges having the same source vertex are stored contiguously in memory. With BFS-based query execution, the edges of the source vertex are accessed one after the other, thereby taking advantage of their contiguous storage locations.

Still, BFS has some inherent shortcomings with respect to graph query execution, especially for distributed graph DBMSs. First, because all possible intermediate results are materialized at every stage of query execution, BFS faces problems resulting from the combinatorial explosion effect described above. Second, locality in distributed graph data is much more limited, given that many edges lead to vertices maintained by remote machines. As a result, a large part of the intermediate results produced at each stage of query execution must be sent as inter-machine communications, creating large network bursts. Also, BFS-based query execution on a distributed system is susceptible to work imbalance because one machine might have finished matching a stage, while the rest of the machines still have significant work for that stage.

Depth First Search-Based Traversal

DFS is a classic alternative to BFS. DFS is not commonly deployed for graph queries, in practice, because of the complexities required to achieve good DFS-based query execution performance. Specifically, instead of expanding edge traversal horizontally (as with BFS), DFS-based traversal techniques cause processing entities (performing in parallel within and across the one or more devices of the DBMS, where possible) to complete and match the whole query path pattern one result at a time. For DFS, the DBMS does not need to hold all intermediate results for all possible expansions; only the intermediate result data required for the current path being explored is maintained by each processing entity.

For example, a DBMS attempts to match a vertex (a) from a query path pattern with a first vertex from graph data. If the first match succeeds, the DBMS moves to matching the next vertex (b) in the query path pattern with a vertex in the graph data that is connected to the first matched vertex via a type of edge indicated in the query, if such a type is indicated. If the next match succeeds, the DBMS continues to attempt matching vertices in the query path pattern to vertices in the graph data. If there is no edge/vertex in the graph data that matches at any stage of the query path pattern, the DBMS backtracks to the previously-matched vertex and continues matching from there, excluding vertices in the graph data that were found to not match the query path pattern. Thus, the DBMS attempts to match the whole query path pattern edge by edge. If the DBMS succeeds in matching a sequence of vertices in the graph data to the query path pattern, the set of matched vertices represents a final result of the query.

To illustrate DFS-based execution of a graph query, a database server instance applies the query path pattern (a)→(b)→(c) against graph database 100 (FIG. 1) using DFS-based traversal techniques. FIG. 3 depicts three stages 310, 320, and 330 of query execution that the DBMS moves through when searching for a match to the query path pattern using DFS-based traversal techniques. Specifically, at stage 310 (matching vertex (a) of the query path pattern), the database server instance matches v0 to vertex (a) of the query path pattern. Based on this initial match, the DBMS moves on to stage 320 (matching vertex (b) of the query path pattern) to expand the search from the match of v0 to vertex (a) to a neighbor node of v0. At stage 320, the DBMS matches v1 to vertex (b). Subsequently, the DBMS moves on to stage 330 (matching vertex (c) of the query path pattern) with the identified path prefix (v0)(v1). At stage 330, the DBMS matches v2 to vertex (c) of the query path pattern, thereby finding (v0)(v1)(v2) to be a match for the query path pattern. Accordingly, the DBMS includes this path in the set of final results for the query. Note that the only intermediate result data that is maintained by the DBMS is the data required to explore the current path.

After identifying the final result (v0)(v1)(v2) for the query, the DBMS backtracks to the longest prefix of the identified path that has a neighbor that has yet to be explored, and continues exploration from that point. In the example DFS-based traversal of FIG. 3, the DBMS reverts to the prefix (v0)(v1) and returns to stage 330 (matching vertex (c) of the query path pattern) to determine if an unexplored neighbor of v1 (i.e., v4) is a match for vertex (c) of the query path pattern. Once there are no more neighbors of v1 to explore, the query backtracks to v0 as a match for vertex (a) of the query path pattern and continues DFS-based query execution by entering stage 320 (matching vertex (b) of the query path pattern) and matching v2 with vertex (b). This approach continues until there are no more paths through the graph data that are accessible from v0. The exploration then continues with a different match for vertex (a) of the query path pattern, such as v1.

DFS has an important benefit for graph querying. Specifically, DFS eagerly expands intermediate results to final results, thus reducing the memory footprint required to hold intermediate results. Still, DFS has the disadvantages of discarding any existing locality, and of complicated parallelism (both within and across machines). The lack of locality arises from following patterns in a depth-first manner, resulting in edge chasing (i.e., following one edge after the other), and generally not accessing adjacent edges in order.

DFS Across Distributed Systems

DFS-based graph query execution is further complicated by being executed on distributed systems. For example, a sender thread may be required to wait for an acknowledgment or for data from one or more remote machines in order to complete a currently matched path, which reduces the efficiency of the thread.

Additionally, the DFS-based graph query execution can cause repeated traversal over a same edge, forcing the system to send messages multiple times across nodes for the same data. For example, consider the following query:

MATCH (a)→(b)→(c)→(d)

If a first node contains one vertex that satisfies (a) and three vertices that satisfy (b), all of which have an edge to a vertex on a different node, execution of a DFS-based query would involve three instances of matching the first two vertices and then requesting additional data from the different node.

One solution to the above problem is to have the first node request the matching vertex from the second node and store the matching vertex on the first node, thereby removing the requirement to send a message across nodes for each instance of matching. Yet this solution has its own problems. Firstly, with more complicated queries or larger distributed datasets, this can cause the first node to store a large amount of data, thereby removing the initial benefits of a distributed dataset. Second, sending the full vertices can create a larger network burden than just sending a message. Thirdly, storing all of the vertices on the first node removes the benefit of multiple nodes being able to perform operations in parallel.

Thus, it would be beneficial to limit the amount of memory required to run a query by a graph DBMS over a distributed system while preserving the ability to parallelize work across and within the one or more machines of the graph DBMS.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 5 depicts a flowchart for performing dynamic graph traversal for query execution.

DETAILED DESCRIPTION

Figure 1:
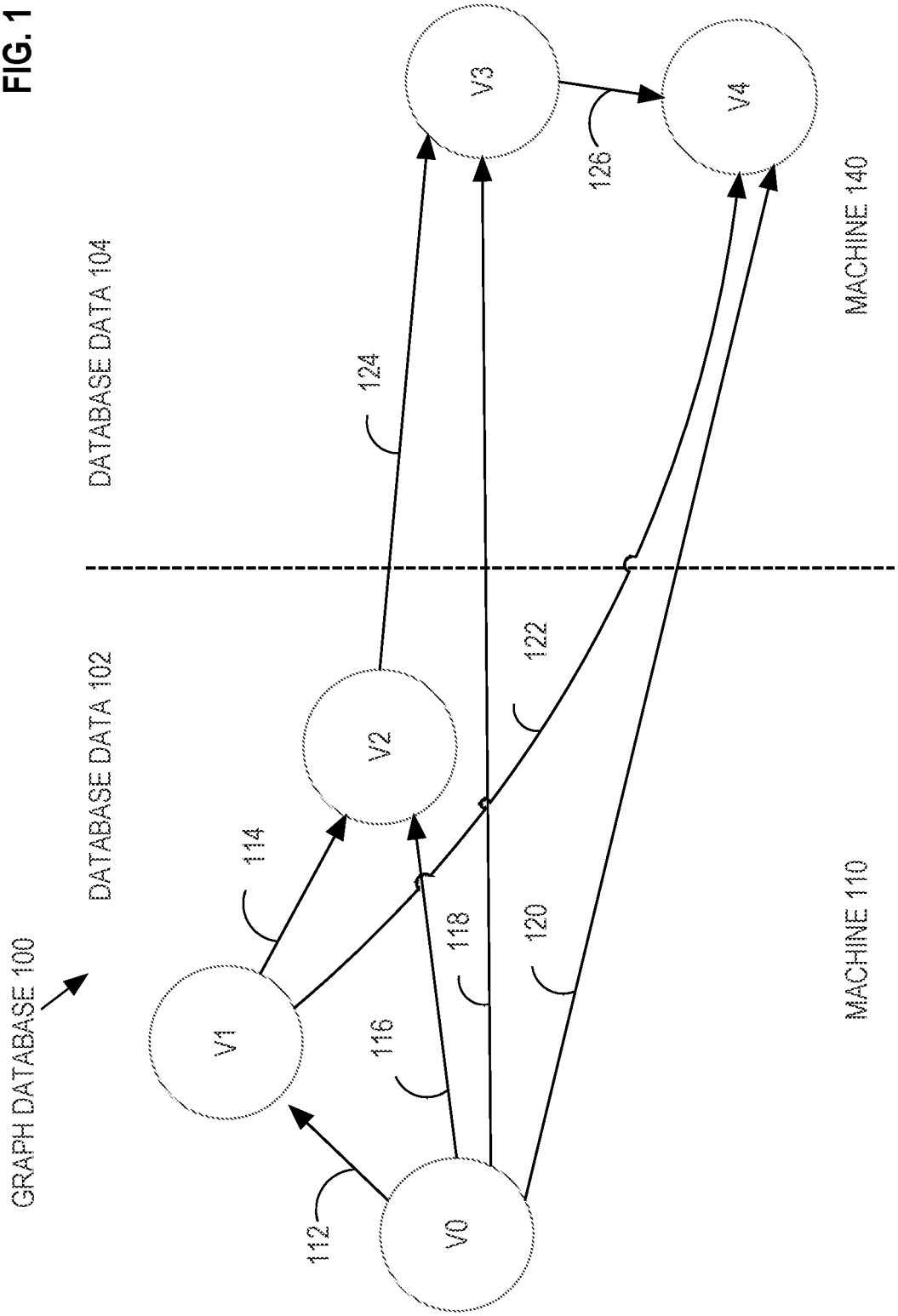
FIG. 1 depicts example graph data maintained by a distributed graph database management system.
Figure 2:
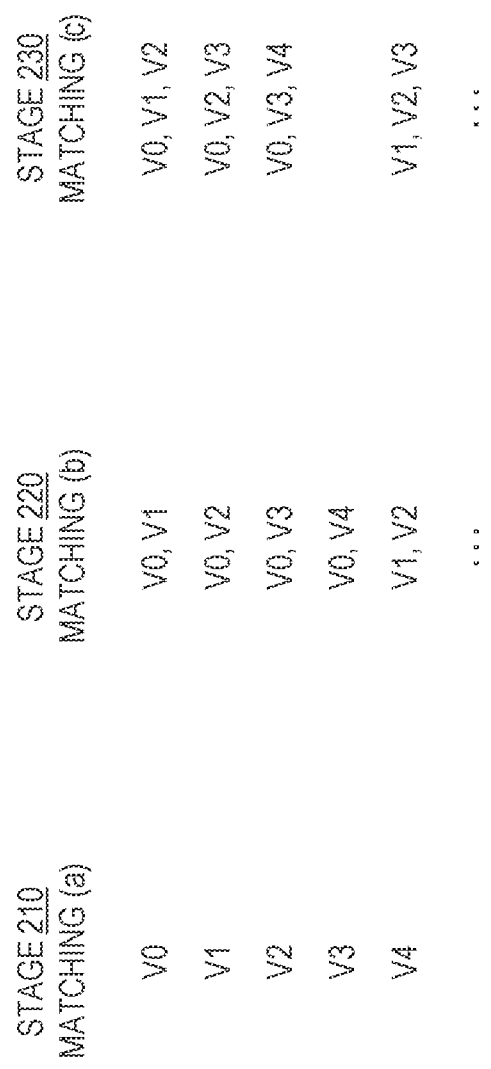
FIG. 2 depicts stages of path pattern matching using breadth first search-based techniques.
Figure 3:
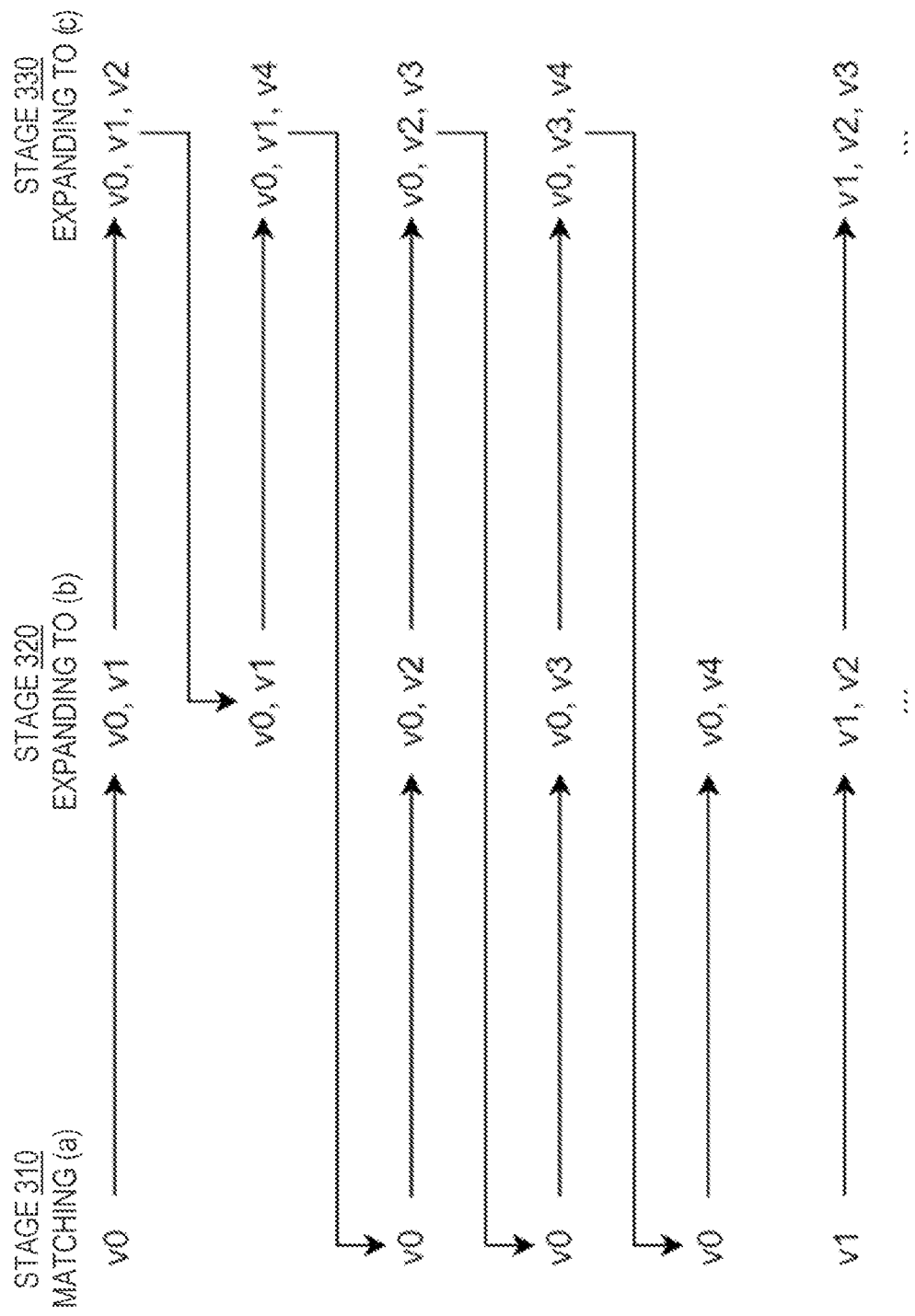
FIG. 3 depicts stages of path pattern matching using depth first search-based techniques.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described for improving efficiency of performing depth first search-based traversal of graph vertices across a plurality of nodes in a distributed system. In an embodiment, a first node evaluates a first portion of a graph query against vertices stored on the first node in a particular instance of evaluating the graph query. The first node determines that a next vertex to be evaluated is a particular vertex on a second node. The first node generates a message to the second node comprising any data required for the second node to continue the evaluation of the graph query, an identifier of the stage of evaluation of the graph query, and an identifier of the particular vertex on the second node. The first node then terminates the particular instance of evaluating the graph query.

Techniques are further described for eliminating duplicate messages from a first node to a second node when accessing a same vertex in an aggregation query. In an embodiment, the first node determines, in a second instance of evaluating the graph query, that a next vertex to be evaluated is the particular vertex and that the stage of evaluation of the graph query at the particular vertex in the second instance is the same stage of evaluation at the particular graph vertex as in the first instance. In response to the determination, the first node adds the results of the second instance of evaluating the graph query to the message. Adding the results may include performing intermediate aggregations for aggregation queries. Adding the results may include merging two existing messages and/or augmenting the previously generated message.

Graph Data

Embodiments are described herein in the context of the property-graph model of graph data representation, in which data topology is represented as vertices and edges. In this model, properties of graph data are stored separately, e.g., as metadata of vertices and/or edges. Nevertheless, embodiments may be implemented for graph data that is modeled according to other techniques, such as the resource description framework (RDF) model, which represents the whole graph as a set of triples of the form {subject, predicate, object} and, as such, includes links for every piece of data in the graph, including constant literals.

Figure 4:
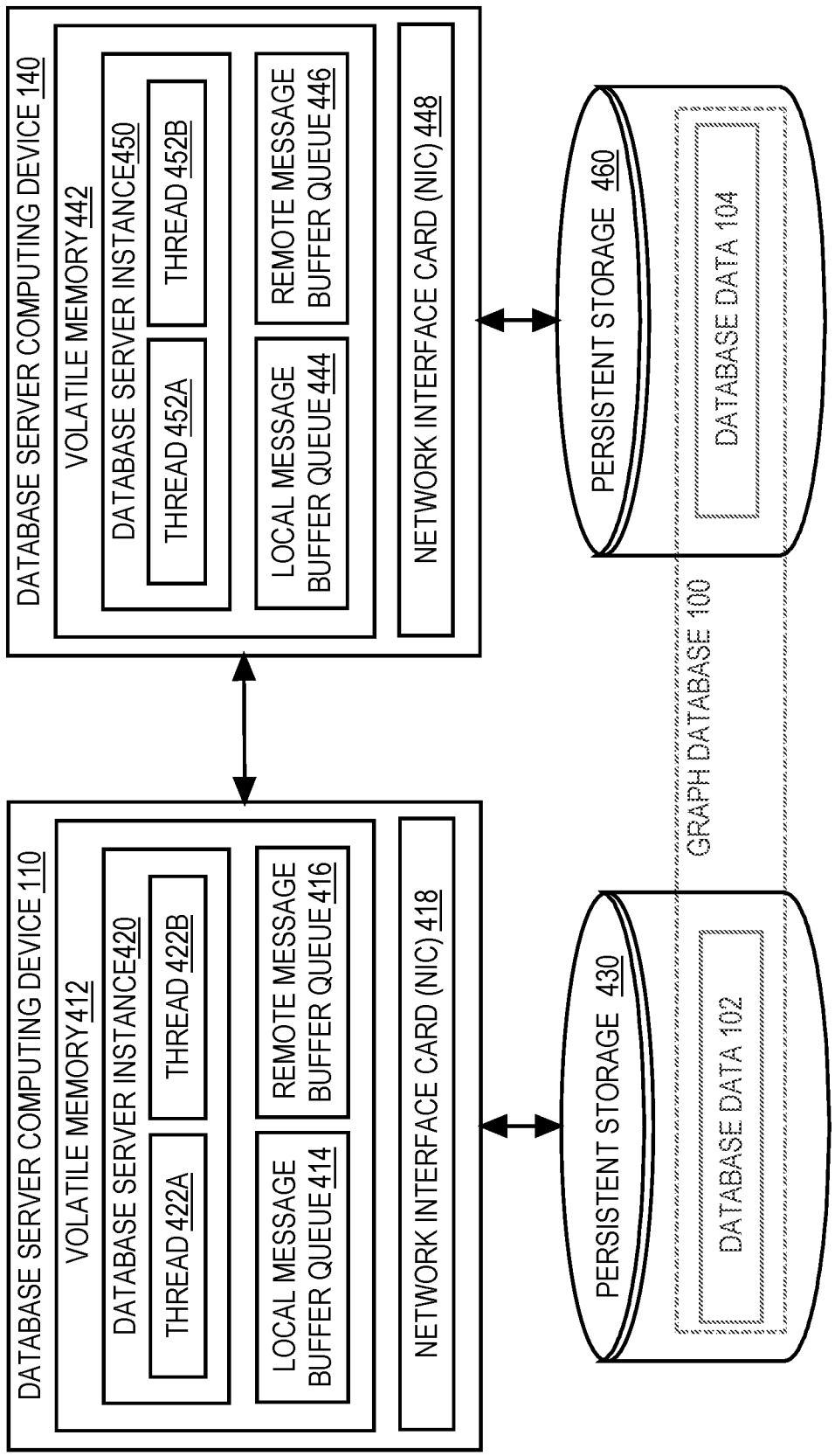
FIG. 4 is a block diagram that depicts an example arrangement for a distributed graph database management system.

Furthermore, embodiments are described using PGQL-style graph pattern matching queries, but may be implemented using any kind of graph query, including SPARQL, Cypher, Gremlin, etc. In its simplest form, graph pattern matching makes it possible to find patterns in graphs with filters. In PGQL, the projection portions of a query, as well as the aggregation operations, are the same as in SQL. In addition to the aspects of PGQL that are similar to SQL, PGQL includes support for graph patterns and vertex and edge labels, which can be used to indicate types of vertices and edges. For example, the following query is a PGQL query that has syntax that might be found in a SQL query, other than the included MATCH clause:

SELECT p1.fullName, p2.fullName, COUNT(p3) AS count
MATCH (p1:person)-[:friend]→(p2)-[:friend]→(p3)
WHERE p1 !=p3
  AND p1.age=p2.age
GROUP BY p1, p2
ORDER BY count DESC Embodiments herein are described in the context of a distributed database system 400 comprising multiple database server instances that maintain database data on disks that are not shared among the multiple database server instances, as depicted in FIG. 4. Nevertheless, techniques described herein for dynamic traversal of graph data may be performed by any implementation of a database system, e.g., on a single-node database system that comprises a single database server instance, on a multi-node shared-memory database system that comprises multiple database server instances that access the same shared storage, on a multi-tenant database system comprising a single database server instance that serves multiple distinct databases, etc.

FIG. 4 depicts an example distributed database system 400 comprising a first database server instance 420 running on a first database server computing device 110, and a second database server instance 450 running on a second database server computing device 140. Instances 420 and 450 maintain portions of a graph database 100, i.e., database data 102 maintained in persistent storage 430 by instance 420, and database data 104 maintained in persistent storage 460 by instance 450. Examples of graph database implementations include Spatial and Graph Analytics Oracle RDBMS, Big Data Appliance, and Oracle Graph Cloud Service. (More information regarding Spatial and Graph Analytics Oracle RDBMS may be found in "Spatial and Graph Analytics with Oracle Database 18c", an Oracle White Paper, February 2018, the entire contents of which are hereby incorporated as if fully set forth herein.)

Querying Graph Data

Upon receiving a query, system 400 determines an execution plan for the query, where the execution plan contains a complete description of the query (i.e., which vertices to match, in which order, with what filters, and what output to produce). The plan includes "stages" and "hops", where a "stage" is responsible for matching exactly one vertex of the query path pattern. The information for a given stage also stores necessary information for matching and transitioning to any subsequent stage. The transitioning between stages happens via respective "hops". The purpose of a hop is to transfer context data from one stage to a subsequent stage of the query plan, which requires migration to a different machine if the information for a required edge or vertex in the graph data resides on a machine that is remote from the machine executing a present stage.

Thus, execution of a query against graph database 100 is split into one or more execution stages, e.g., by a query optimizer of system 400, where each stage of query execution comprises one of (a) exploration of a stage/hop in a path that is a potential solution for the query, or (b) processing of a final vertex in a path that is a potential solution for the query. The stages of query execution may be performed asynchronously and in parallel by multiple processing entities, e.g., multiple instances of a multi-node database system, multiple threads on a single-node database system, multiple threads running on multiple machines of a multi-node database system, etc. References to "processing entities" herein refer to threads and/or database server instances, depending upon implementation.

In the context of distributed system 400 depicted in FIG. 4, both machines initiate path exploration for a given query on every vertex that the machine owns, excluding any vertices that are determined to be filtered out by the query. At each stage of query execution, if property values of a given path do not match query requirements, the processing entity ceases exploration of the path and discards the path from the set of potential query solutions.

To illustrate, database system 400 receives the following Query 1 over graph database 100:

(Query 1)
SELECT a.age, b.age, MIN(c.age) MATCH (a)→(b)→(c)
   WHERE a.age>40

The path pattern for Query 1 is (a)→(b)→(c). Database system 400 organizes execution of Query 1 into three execution stages, where each stage corresponds to a corresponding vertex in the Query 1 path pattern. In this case, database system 400 causes the first execution stage of Query 1 to be initiated for vertices in graph database 100 that satisfy the filter a.age>40. In the absence of any filter in the query applying to vertex (a), the first execution stage of the query would be initiated for all vertices in the graph database.

Distributed System DFS Query Execution

According to an embodiment, a multi-node computing system evaluates a graph query against graph data that is stored across the multi-node computing system. FIG. 5 is a flowchart depicting an example method for performing a depth first search-based traversal of graph data stored across a plurality of nodes in a multi-node system. The graph data comprises a plurality of vertices and a plurality of edges that represent relationships between the plurality of vertices.

To illustrate the method of FIG. 5, system 400 of FIG. 4 may receive the following Query 2 to be run over graph database 100.

(Query 2)
SELECT a, b, c, d MATCH (a)-[e]→(b)-[f]→(c)-g→(d)
   WHERE id(a)=1

System 400 determines an execution plan for Query 2, which includes a stage for each vertex in the Query 2 path pattern (a)→(b)→(c)→(d). During query execution, the database server instances of system 400 apply stages of Query 2 execution on vertices of graph data in database 100, and hops to edges in the database, while fulfilling potential filters (e.g. MATCH (a)-[e]→(b)-[f]→(c)-g→(d) WHERE id(a)=1 contains an ID filter). Filters generally put restrictions on matched vertices/edges.

Queries may additionally include one or more aggregations. Example aggregations include COUNT, SUM, AVG, MIN, and MAX. Where the output of Query 2 may comprise the nodes that match the query expression, the output of an aggregation query may comprise an aggregated value. For instance, a COUNT aggregation may return a number of patterns that match the query expression, a SUM aggregation may return a summation of one or more specific value in matched vertices, an AVG aggregation may return an average of one or more specific values in matched vertices, a MIN aggregation may return a minimum of one or more specific values in matched vertices, and a MAX aggregation may return a maximum of one or more specific values in matched vertices.

To illustrate an aggregation query, Query 2 may be expanded as follows:
(Query 3)
SELECT COUNT (c), MIN (b.age) MATCH (a)-[e]→(b)-[f]→(c)-g→(d) WHERE id(a)=1

Query 3 includes a COUNT aggregation over vertices that match (c) and a MIN aggregation over the age field of vertices that match (b). Thus, the execution of Query 3 may return two values, the number of vertices that match (c), and the minimum value for the age field of vertex (b).

Referring to FIG. 5, at step 502, a first node of the multi-node computing system determines, in a particular instance of evaluating a graph query, that one or more vertices on the first node match a first portion of the graph query and that a second vertex that is to be evaluated next is stored on a second node separate from the first node. The particular instance of evaluating the graph query may refer to a specific depth first traversal instance. For example, if the first node evaluating Query 3 stored vertices $V_0$ and $V_1$, both of which satisfied the filter of id (a)=1, an evaluation of the graph query starting at $V_0$ may comprise a first instance of evaluating the graph query and an evaluation of the graph query starting at $V_1$ may comprise a second instance of evaluating the graph query. Separate instances of evaluating the graph query may start at a same vertex. For example, if the first node evaluating Query 3 identified $V_0 \rightarrow V_1$ and $V_0 \rightarrow V_2$ as both satisfying the first portion of the graph query, each may be considered a separate instance of evaluating the query even if the first part of evaluating $V_0 \rightarrow V_2$ was already performed in evaluating $V_0 \rightarrow V_1$.

In an embodiment, the first node determines that an edge originating from the one or more vertices on the first node that match the first portion of the graph query lead to the second vertex on the second node. As the second vertex is not stored on the first node, the first node may be unable to determine whether the second vertex matches a second portion of the graph query. Alternatively, for a query that ends at the second vertex, the first node may determine that the second vertex satisfies the second portion of the query, but may be unable to gather information from the second vertex. Thus, the first node may determine that the second vertex on the second node is a next vertex to be evaluated.

Result Messages

At step 504, in response to determining that the next vertex to be evaluated is stored on the second node separate from the first node, the first node generates a message from the first node to the second node. The message may comprise one or more results of the first portion of the graph query based on the one or more first vertices, an identifier of the second vertex, and a current stage of evaluating the graph query. The identifier of the second vertex allows the second node to determine which vertex to evaluate next when the message is received. The current stage of evaluating the graph query refers to data identifying how much of the query has been matched or processed. For example, the system may identify, in the message, how many vertices have already been matched to the graph query prior to evaluation of the vertex on the second node and/or how many vertices will have been matched to the graph query after evaluation of the vertex on the second node. The message may additionally identify the node to which the message is being sent.

In an embodiment, the results of the first portion of the graph query comprise all or a portion of the vertex data from each previously matched vertex. For example, as Query 2 requests a return of vertices that match the graph query, the results of the first portion of the graph query may include the entirety of each matched vertex. Conversely, Query 1 requests a return of a.age, b.age, and MIN(c.age). Thus, if the first portion of the graph query only matches a vertex to a, the results of the first portion of the graph query may comprise the value for a.age instead of the entirety of vertex a. The results may additionally or alternatively comprise an identifier of the vertices that were matched to the first portion of the query.

In an embodiment, the results of the first portion of the graph query comprise one or more values used for performing an aggregation. For example, if the first node matched the first two vertices of Query 3, the node may store the value for b.age in the message, as the value for b.age will be used in the MIN aggregation. For MIX, MAX, SUM, and AVG aggregations, the results may thus comprise the value from the vertex. For COUNT, a 1 may be stored to indicate a single instance or no additional value may be stored as a message without a value may be considered to have a count of 1.

In an embodiment, the results of the first portion of the graph query comprise additional information required to evaluate future vertices. The first node may identify the additional information based on the query, such as by identifying filters that use information from the vertices in the first portion of the query, but that cannot be fully evaluated using the vertices in the first portion of the query. For example, given the following Query 4:
(Query 4)
SELECT COUNT (a) MATCH (a)-[e]→(b)-[f]→(c) WHERE b.salary>c.salary if the first node matches the first two vertices and determines a third vertex on the second node is the next to be evaluated, the first node may include in the message to the second node the value of (b.salary) as the second node may use the value of (b.salary) to determine if the filter condition is met. Conversely, if the filter condition was WHERE b.salary>a.salary, the first node may evaluate the condition with respect to the first two vertices generate a message to the second node without either of the values, as the filter condition has already been evaluated.

Message Merging

Steps 506-508 comprise optional message merging steps that may be performed for one or more graph queries. In implementations that do not use message merging, the process method may skip steps 506-508 and proceed to step 510. In an embodiment, completed messages are not immediately sent to other nodes, but are instead stored in a buffer cache. The cached messages may then be merged prior to sending, thereby decreasing the cost of sending multiple messages and reducing storage requirements.

At step 506, the first node determines, in a second instance of evaluating the graph query, that one or more third vertices on the first node match the first portion of the graph query and that a fourth vertex to be evaluated next is a same vertex as the second vertex. For example, the first node may determine that a second instance of the query has reached the same stage as the first instance of the query and that both instances are sending a message to a same machine and same vertex.

Step 506 may be performed after a message has been created for the second instance of the query or instead of creating a message for the second instance of the query. For example, two existing messages may be merged based similar characteristics. For instance, multiple threads may generate messages in parallel. Messages may be merged at the thread level, where multiple messages created by a single thread are merged, and/or at the machine level, where messages generated by different threads may be merged. Thus, the machine level merge may comprise merging two messages that were already merged at the thread level. Alternatively, a node may determine, during an instance of evaluating the graph query, that the instance could be merged with an existing message and, instead of generating a message and merging with the existing message, may update the existing message with data from the instance.

At step 508, in response to determining that the one or more third vertices match the first portion of the graph and that the fourth vertex is the same vertex as the second vertex, the first node adds one or more second results of the first portion of the graph query based on the one or more third vertices to the message. For example, the first node may de-duplicate data by merging multiple messages into a single message. Thus, messages sent to the same machine and vertex at the same stage may be merged into a single message by adding the results of the second instance of evaluating the query to the results of the first instance of evaluating the query. For example, if a first message includes the following data {stage 2, vertex $V_3$, $V_0V_1$} indicating that the graph query evaluation is at stage 2, is targeting vertex $V_3$, and has initial results of $V_0V_1$, the message may be merged with a second message including the following data {stage 2, Vertex $V_3$, $V_0V_2$} to create a message with the following data {stage 2, vertex $V_3$, $V_0V_1|V_0V_2$}. As certain data fields are de-duplicated, such as the stage and target vertex, the system is able to generate more efficient messages.

While the above message depicts a de-duplication where the stage, target vertex, and target machine are the same, other forms of message merging may be used to deduplicate data on a plurality of messages. For example, a plurality of messages with the same initial results and same stage that is to be sent to the same target machine may be merged when the target vertex differs. As an example, the system may merge a message comprising the following data {stage 2, vertex $V_3$, $V_0V_1$} with a message comprising the following data {stage 2, vertex $V_4$, $V_0V_1$} to create a message comprising the following data {stage 2, vertex $V_3|V_4$, $V_0V_1$}. This form of de-duplication allows the system to reduce the cost of sending multiple messages with the same results that are being sent to the same machine, but different target vertices.

Aggregation Merging

In an embodiment, adding the results of the second results of the first portion of the graph query based on the one or more third vertices to the message comprises performing partial aggregations. For example, the system may receive a message with an aggregation function, such as MIN, MAX, SUM, COUNT, or AVG. If some or all of the aggregation can be performed with data in the first portion of the query, the first node may perform a partial aggregation and send the results as part of a single message. This may be performed for some or all messages which target the same machine and vertex at the same stage. As an example, Query 4 comprises an aggregation over the first vertex. Thus, if the first portion of the graph query comprises vertices that match the (a) portion of the query, the system may perform the aggregations over the (a) portion of the query and send a message to the second node comprising the results of the aggregation, the target vertex, and the stage of the graph query. Deduplication techniques for each of the aforementioned types of aggregations are described below.

MIN. A MIN aggregation returns the smallest value of a plurality of values. When a graph query includes a MIN aggregation, the first node may add the one or more second results of the first portion of the graph query by determining whether the one or more second results of the first portion of the graph query comprise a value for the MIN that is less than the value from the one or more first results and, if so, replacing the value from the one or more first results with the one or more second results. Thus, each time a message is merged in the MIN aggregation, the first node may identify the lowest value for the MIN aggregation and keep that value in the message while discarding the others. When the message is sent to the second node, the message may comprise a single value for the MIN aggregation.

MAX. A MAX aggregation returns the largest value of a plurality of values. When a graph query includes a MAX aggregation, the first node may add the one or more second results of the first portion of the graph query by determining whether the one or more second results of the first portion of the graph query comprise a value for the MAX that is greater than the value from the one or more first results and, if so, replacing the value from the one or more first results with the one or more second results. Thus, each time a message is merged in the MAX aggregation, the first node may identify the highest value for the MAX aggregation and keep that value in the message while discarding the others. When the message is sent to the second node, the message may comprise a single value for the MAX aggregation.

SUM. A SUM aggregation returns a summation of a plurality of values. When a graph query includes a SUM aggregation, the first node may add the one or more second results of the first portion of the graph query by computing a summation of a value from the one or more second results of the first portion of the graph query and a value from the one or more first results of the first portion of the graph query. Thus, each time a message is merged in the SUM aggregation, the first node may compute a summation of the stored results and any new results of the first portion of the graph query. When the message is sent to the second node, the message may comprise a single value for the SUM aggregation.

COUNT. A COUNT aggregation returns a number of unique results of the graph query across one or more nodes. When a graph query includes a COUNT aggregation, the first node may add the one or more second results of the first portion of the graph query by incrementing a counter for each message merged. This may be performed by storing a "1" for each message as the results of the individual message and adding these results when messages are merged. Thus, if messages are merged at the thread level and again at the machine level, the messages merged at the machine level may include numbers larger than "1" as the results for the one or more first portions of the graph query. Thus, each time a message is merged in the COUNT aggregation, the first node may compute a summation of a count number in the messages. When the message is sent to the second node, the message may comprise a single value for the COUNT aggregation.

AVG. An AVG aggregation returns an average of a plurality of values. When a graph query includes an AVG aggregation, the first node may perform a COUNT aggregation and a SUM aggregation as described above. Thus, each time a message is merged in the COUNT aggregation, the first node may compute a summation of COUNT values and a summation of SUM values. When the message is sent to the second node, the message may comprise two values for the AVG aggregation, the COUNT value and the SUM value. This allows future nodes to compute the average, as an average computed from only the matches on one node may need to be weighted to compute an actual average.

In an embodiment, the system merges multiple aggregations if the graph query includes multiple aggregations. For example, Query 3 includes a COUNT aggregation and a MIN aggregation. If the first two vertices are matched on the first node, the first node may perform the MIN aggregation for the second vertex. As the COUNT aggregation is being performed on the second node, the first node may track data needed for performance of the COUNT aggregation, such as a number of messages that were merged into a single message.

In an embodiment, the system restricts merges based on additional filters in the graph query. The first node may determine that the graph query includes a filter condition that cannot be fully evaluated at the first node, but involves vertex data from the first node and, in response, only merge messages with the same vertex data involved in the filter condition of the graph query. For example, Query 4 includes an aggregation over a first vertex and a filter based on a second and third vertex. If a merged message is generated for a first stage of the query where only one vertex is matched on the first node, the first node may include all matches that are leading to the same vertex on the second node. If the merged message is generated for a second stage of the query where two vertices are matched on the first node, the first node may only merge messages that have a same second vertex, as the filter condition is based on the second vertex. Thus, a match of $\{V_0, V_2\}$ may be merged with $\{V_1, V_2\}$ but not with $\{V_0, V_3\}$ as the information for the filter condition would vary between $V_2$ and $V_3$.

Message Completion

At step 510, in response to generating the message from the first node to the second node, the first node ceases the particular instance of evaluating the graph query. For example, a thread evaluating Query 4 may match two vertices on the first node and determine that the next vertex to evaluate for the graph query is a particular vertex on the second node. The thread may generate the message to the second node comprising the results from the first two vertices and an identifier of the particular vertex. The first instance of evaluating the graph query thus includes all three vertices, the first two on the first node and the third on the second node. If the first node determines that the first two vertices lead to a fourth vertex on the second node, this evaluation may be considered a second instance of evaluating the graph query.

Ceasing the particular instance of evaluating the graph query may comprise ceasing use of CPU cycles previously dedicated to the instance of the graph query and/or provisioning CPU cycles previously dedicated to the instance of the graph query to perform other tasks. Thus, CPU cycles are not spent waiting for a response from the second node, but can be utilized by the first node for other tasks. As an example, a thread may generate a message including the results of a first two vertices and an identification of a third vertex on the second node. Without waiting for a response from the second node, the thread may proceed to evaluate a second instance of the graph query which matches the same first two vertices but is being sent to a different fourth vertex on the second node.

In an embodiment, a created message is stored locally on the first node prior to being ejected into a queue for sending to the second node. In an embodiment, the system ejects the message into the queue for sending to the second node in response to determining that a size of the message is greater than a threshold size. For example, the first node may merge multiple messages into a particular message being sent to the second node. After a successful merge, the first node may determine whether the size of the merged message is greater than a threshold size. If the merged message is greater than the threshold size, the system may eject the message, thus keeping the sizes of merged messages from growing large enough that it adversely affects performance. Messages may also be ejected when the local storage is full or after a particular period of time. As an example, when a local cache of messages is full, the first node may eject a message using the least recently used (LRU) ejection strategy.

Practical Example

Figure 6A:
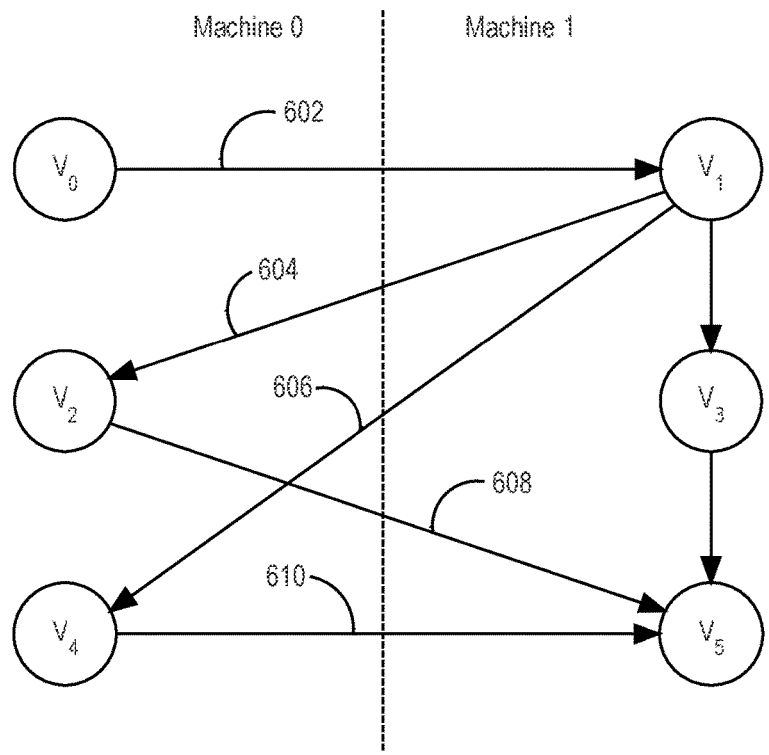
FIG. 6A depicts a practical example of evaluating a graph query through a distributed system.

FIG. 6A depicts a practical example of evaluating a graph query through a distributed system. In FIG. 6, a first node, referred to as Machine 0, stores three vertices, $V_0$, $V_2$, and $V_4$, while a second node, referred to as Machine 1, stores three different vertices, $V_1$, $V_3$, and $V_5$. In evaluating a graph query, such as Query 3, a first thread on Machine 0 identifies $V_0$ as an initial vertex and determines that a next vertex to be evaluated is $V_1$ on Machine 1. The first thread generates a message to Machine 1 with an identifier of a stage of evaluating the query, one or more results of evaluating the query, and an identifier of vertex $V_1$. Given that Query 3 includes a count aggregation, the results of the query may include a count of 1 and/or an identifier of $V_0$. In an embodiment, if the graph query only returns an aggregation that only involves vertices other than the first, Machine 0 may send a message without any results.

At step 602, the Machine 0 sends the message to Machine 1. The thread that was performing that instance of evaluating the graph query does not wait for a response from Machine 1. Instead, Machine 1 will continue evaluating that instance of the graph query and the thread that was initially evaluating that instance of the graph query can terminate or move on to a different task. On Machine 1's side, Machine 1, after evaluating vertex $V_1$, determines that vertex $V_1$ has three edges to evaluate, two of which are on Machine 0 and one of which is on Machine 1. The thread on Machine 1 may send a first message at step 604 to Machine 0 that identifies $V_2$ as the next vertex to evaluate at a first instance of evaluating the graph query, send a second message at step 606 to Machine 0 that identifies $V_4$ as the next vertex to evaluate at a second instance of evaluating the graph query, and continue to evaluate vertices $V_3$ and $V_5$ at a third instance of evaluating the graph query. In an embodiment, Machine 1 may merge the messages for steps 604 and 606 into a single message that includes the results of $V_0$ and $V_1$ and identifies both $V_2$ and $V_4$ as next vertices to evaluate.

Machine 0, after receiving the message or messages from Machine 1, may evaluate vertices $V_2$ and $V_4$. Given the contents of the message or messages from Machine 1 and previous knowledge of the graph query, Machine 0 is able to evaluate the next stage of the graph query without having stored any additional information from previous evaluations and without waiting for a message from Machine 1 after a previous message had been sent. Evaluating vertices $V_2$ and $V_4$ may comprise evaluating filter conditions based on data passed from Machine 1. For example, as Query 4 includes a filter condition of b.salary>c.salary, the message from Machine 1 may include a value for salary from vertex $V_1$. Machine 1 may evaluate the salary value for $V_1$ against the salary values for $V_2$ and $V_3$. If the vertices match the filter condition, Machine 0 may identify next vertices to evaluate. If the vertices do not match the filter condition, Machine 0 may terminate instances of evaluation that did not match.

Figure 6B:
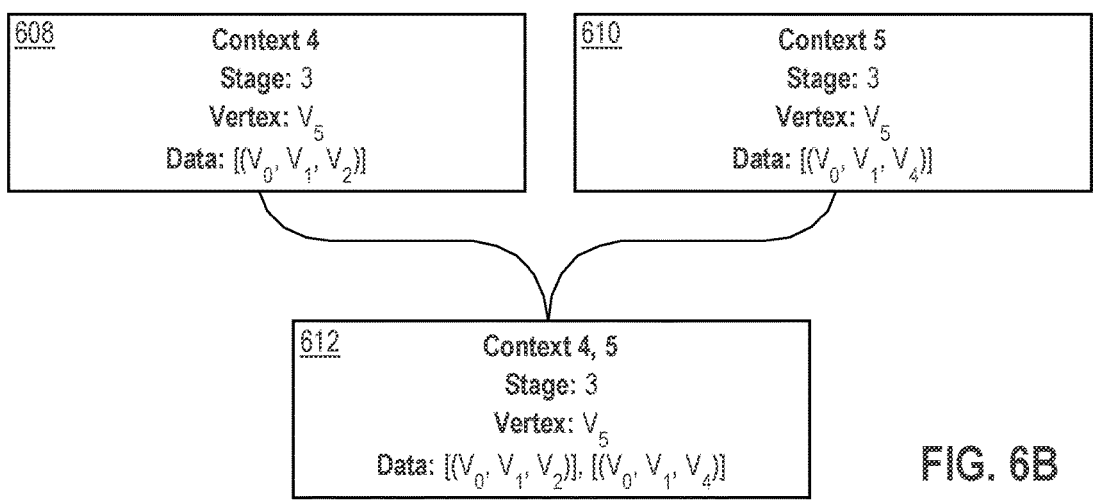
FIG. 6B depicts an example of a plurality of messages being merged.

Vertices $V_2$ and $V_4$ may be evaluated in parallel by separate threads or serially in the order the messages are received. At step 608, after determining that vertex $V_2$ matches the graph query, Machine 0 sends a message to Machine 1 identifying $V_5$ as the next vertex to evaluate, any intermediate results of the graph query based on vertices $V_0$, $V_1$, and $V_2$, and a stage at which vertex $V_5$ is being evaluated. Similarly, at step 610, Machine 0 sends a message to Machine 1 identifying $V_5$ as the next vertex to evaluate, any intermediate results of the graph query based on vertices $V_0$, $V_1$, and $V_4$, and a stage at which vertex $V_5$ is being evaluated. The messages of 608 and 610 may also be combined, as depicted in FIG. 6B. After receiving the message or messages from Machine 0, Machine 1 may perform the final steps of each instance of evaluation and output one or more results. Results from different machines may be aggregated prior to being sent to a client computing device.

FIG. 6A depicts a simple practical example. More complex examples may include more nodes, more vertices on each node, and different stages of evaluation. For instance, in FIG. 6A, Machine 0 has a single evaluation at stage 1 and two evaluations at stage 3, but in other examples, Machine 0 may perform multiple evaluations at any of the stages. Additionally or alternatively, multiple machines may have final evaluations of the query that are then aggregated together to create the results.

FIG. 6B depicts an example of a plurality of messages being merged. The merging of FIG. 6B may be performed in response to Machine 0 determining that both messages comprise evaluations at the same stage, being sent to the same machine, and identifying the same target vertex. Message 608 identifies the instance of evaluation as "Context 4", the stage of evaluation as "3", the next target vertex as "$V_5$," and data including results based on vertices based on vertices $V_0$, $V_1$, and $V_2$. This data may include the vertices themselves and/or data from the vertices. For instance, in Query 3, the aggregation includes a MIN of age on the second matched vertex. Thus, the results may include the age value from vertex $V_1$.

Message 610 identifies the instance of evaluation as "Context 5", the stage of evaluation as "3", the next target vertex as "$V_5$" and data including results based on vertices based on vertices $V_0$, $V_1$, and $V_4$. Thus, message 608 and message 610 may be merged in a single message 612. In an embodiment, the message identifies both of the contexts and includes data from both data sets. In the case of an aggregation, the data may be the results of an aggregation from the messages. In the case of Query 3 which includes a MIN over the second vertex and a COUNT over the third vertex, the data may identify the MIN value as the value from $V_1$ as both instances share the same second vertex, and a number 2 for the COUNT as a total of two messages were aggregated.

Using the methods described herein, the system frees up CPU cycles that would usually be spent waiting to receive a response from other nodes by sending enough information that the other nodes can continue the evaluation. The methods additionally reduce the size of messages that are stored and sent across nodes in the multi-node system by intelligently determining when messages can be merged to save on space, identifying what information is required in the messages to allow other nodes to complete the evaluation, and performing intermediate aggregations.

General Overview: Database Systems

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node DBMS is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Database System Configuration

A database client, not depicted in FIG. 4, connects to database system 400. The client may comprise a database application running on a client node. The client interacts with an instance of database system 400, such as one of instances 420 and 450, by submitting commands that cause the instance to perform operations on data stored in the database. For example, a command may be a request to access or modify data from the database, perform operations on the data, and/or return the data to the client.

Typically, distributed database system 400 is implemented by multiple machines (including device 110 and device 140) that are remotely connected. Referring to FIG. 4, database server instance 420, running on device 110, maintains first database data 102 in persistent storage 430, and database server instance 450, running on device 140, maintains second database data 104 in persistent storage 460. Both database data 102 and database data 104 include graph database data for graph database 100.

According to an embodiment, devices 110 and 140 correspond to clustered machines known as nodes, each running a database server instance, as described above. A database server instance (or "instance") is a server that comprises a combination of the software and allocation of resources from a machine node. Specifically, a server, such as a database server, or any other process is a combination of integrated software components and an allocation of computational resources, such as memory, a node (i.e., a computing device and/or memory accessible to the computing device), and/or sub-processes on the node for executing the integrated software components on a processor, the combination of the software and computational resources being dedicated to performing a particular function on behalf of one or more clients. Instances 420 and 450 collectively implement server-side functions of distributed database system 400.

Database data 102 and 104 may each reside in volatile and/or non-volatile storage, such as first volatile memory 412, second volatile memory 442, first persistent storage 430, and second persistent storage 460. Each node implementing distributed database system 400 may include a virtual disk and/or a set of physical disks. Additionally or alternatively, database data 102 and 104 may each be stored, at least in part, in main memory of a database server computing device.

Database data for graph database 100 may be stored in any type of computer-readable storage media, such as flash storage or non-volatile memory. In some embodiments, graph database 100 is a distributed database comprising a plurality of databases each stored in a respective one or more storage media. In other embodiments, machines implementing the database system have shared access to at least a portion of graph database 100 via shared access to storage storing database data for graph database 100.

One or more of the functions attributed to any process described herein, may be performed any other logical entity that may or may not be depicted in FIG. 4, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
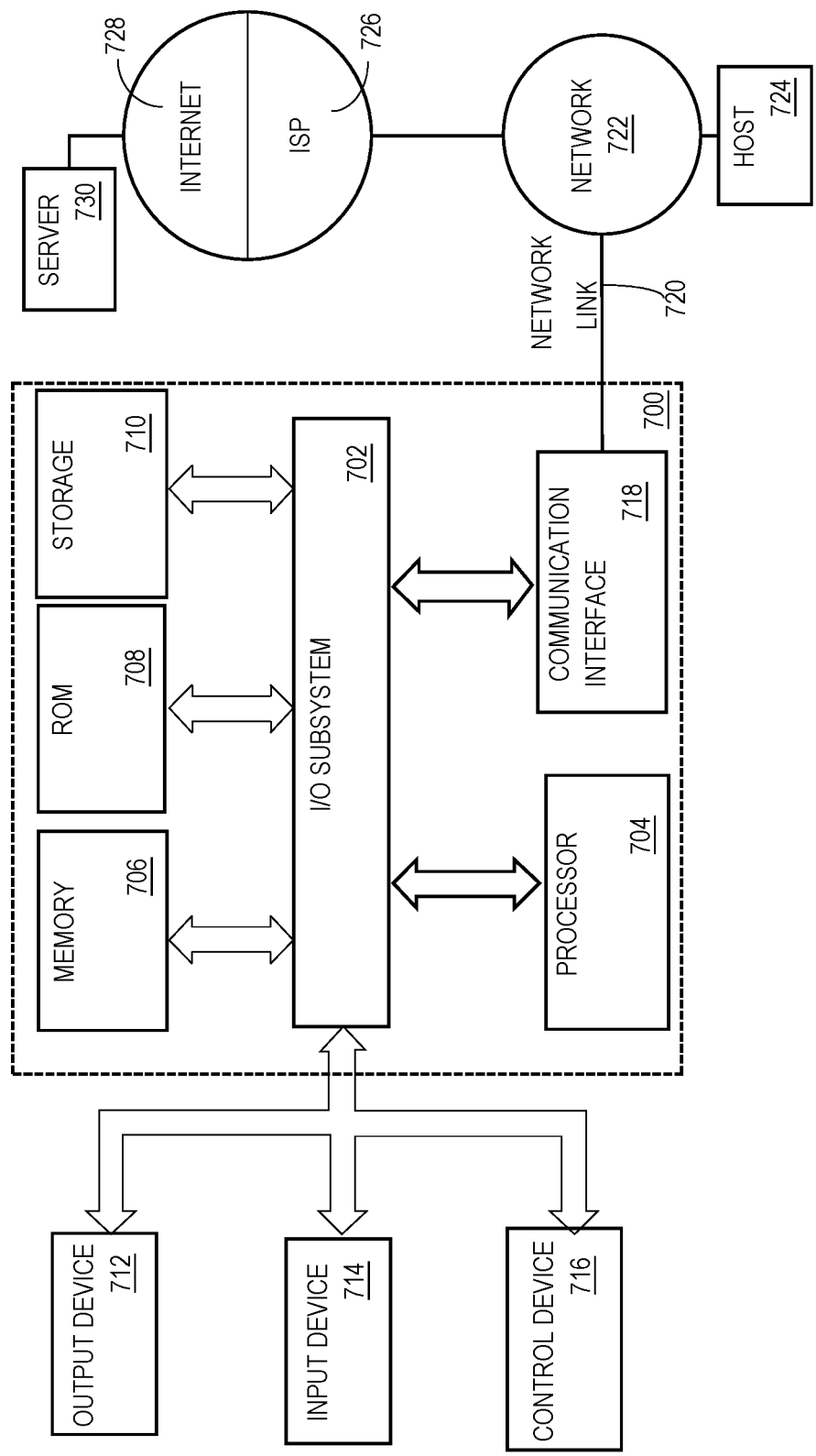
FIG. 7 is a block diagram of a computer system on which embodiments may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
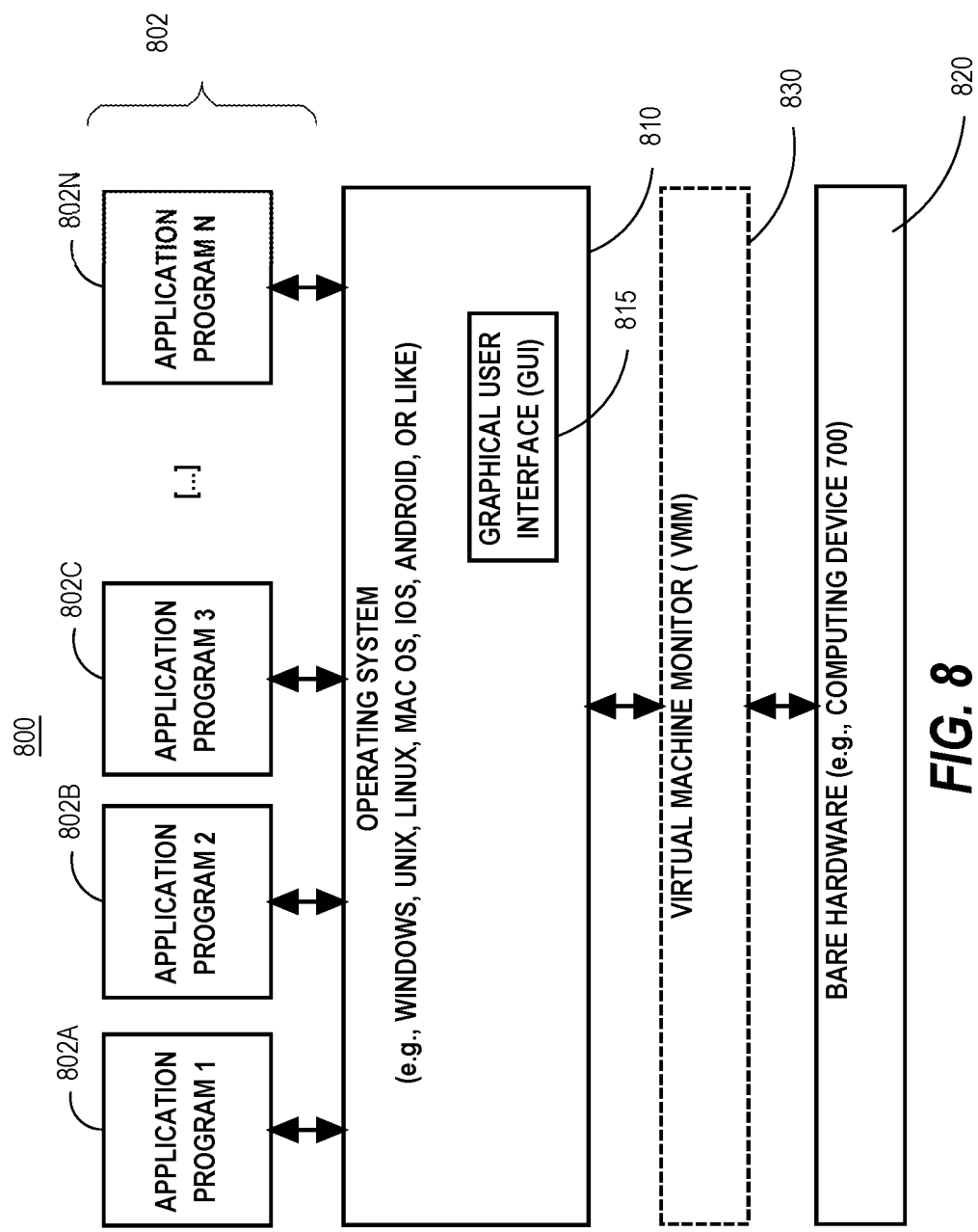
FIG. 8 depicts a software system that may be used in an embodiment.

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    evaluating against graph data a graph query that specifies a particular pattern to match, wherein said graph data is accessible on a multi-node computing system, wherein said graph data comprises a plurality of vertices and a plurality of edges, wherein said evaluating the graph query comprises:
    determining, at a first node of the multi-node computing system, in a particular instance of evaluating the graph query, that one or more first vertices on the first node match a first portion of the graph query and that a second vertex that is to be evaluated next is stored on a second node separate from the first node;
    in response to determining that the next vertex to be evaluated is stored on the second node separate from the first node, generating a first message comprising one or more first results of the first portion of the graph query based on the one or more first vertices, an identifier of the second vertex, and a current stage of evaluating the graph query;
    in response to generating the first message from the first node to the second node, the first node ceasing the particular instance of evaluating the graph query;
    determining, at the first node in a second instance of evaluating the graph query, that one or more third vertices on the first node match the first portion of the graph query and that a fourth vertex to be evaluated next is a same vertex as the second vertex;
    in response to determining that the one or more third vertices match the first portion of the graph query and that a next vertex to be evaluated is stored on the second node, generating, by the first node, a merged message based on the first message and one or more second results of the first portion of the graph query, wherein the one or more second results are based on the one or more third vertices, an identifier of the fourth vertex, and the current stage of evaluating the graph query; and
    sending the merged message from the first node to the second node.

2. The method of claim 1, further comprising:
    after generating the merged message, determining that a size of the merged message is greater than or equal to a threshold value and, in response, sending the merged message to the second node.

3. The method of claim 1:
wherein the graph query is an aggregation query comprising a COUNT aggregation;
wherein generating the merged message comprises incrementing a COUNT value in the merged message.

4. The method of claim 1:
wherein the graph query is an aggregation query comprising a MAX aggregation;
wherein generating the merged message comprises determining that the one or more second results of the first portion of the graph query comprise a first value for the MAX aggregation that is greater than a second value for the MAX aggregation from the one or more first results of the first portion of the graph query and, in response, replacing the second value in the merged message with the first value.

5. The method of claim 1:
wherein the graph query is an aggregation query comprising a MIN aggregation;
wherein generating the merged message comprises determining that the one or more second results of the first portion of the graph query comprise a first value for the MIN aggregation that is lesser than a second value for the MIN aggregation from the one or more first results of the first portion of the graph query and, in response, replacing the second value in the merged message with the first value.

6. The method of claim 1:
wherein the graph query is an aggregation query comprising a SUM aggregation;
wherein generating the merged message comprises adding a value for the SUM aggregation from the one or more second results of the first portion of the graph query to a value for the SUM aggregation from the one or more first results of the first portion of the graph query.

7. The method of claim 1:
wherein the graph query is an aggregation query comprising an AVG aggregation;
wherein generating the merged message comprises:
adding a SUM value for the AVG aggregation from the one or more second results of the first portion of the graph query to a SUM value for the AVG aggregation from the one or more first results of the first portion of the graph query;
incrementing a counter for the merged message.

8. The method of claim 1, wherein the one or more first results comprise identifiers of the one or more first vertices and wherein the one or more second results comprise identifiers of the one or more third vertices.

9. The method of claim 1, further comprising receiving, at the second node, the merged message and, in response, evaluating the next vertex with respect to the graph query.

10. One or more non-transitory computer-readable media storing instructions which, when executed by the one or more processors, causes performance of:
evaluating against graph data a graph query that specifies a particular pattern to match, wherein said graph data is accessible on a multi-node computing system, wherein said graph data comprises a plurality of vertices and a plurality of edges, wherein said evaluating the graph query comprises:
determining, at a first node of the multi-node computing system, in a particular instance of evaluating the graph query, that one or more first vertices on the first node match a first portion of the graph query and that a second vertex that is to be evaluated next is stored on a second node separate from the first node;
in response to determining that the next vertex to be evaluated is stored on the second node separate from the first node, generating a first message comprising one or more first results of the first portion of the graph query based on the one or more first vertices, an identifier of the next vertex, and a current stage of evaluating the graph query;
in response to generating the first message from the first node to the second node, the first node ceasing the particular instance of evaluating the graph query;
determining, at the first node in a second instance of evaluating the graph query, that one or more third vertices on the first node match the first portion of the graph query and that a fourth vertex to be evaluated next is a same vertex as the second vertex;
in response to determining that the one or more third vertices match the first portion of the graph query and that a next vertex to be evaluated is stored on the second node, generating, by the first node, a merged message based on the first message and one or more second results of the first portion of the graph query, wherein the one or more second results are based on the one or more third vertices, an identifier of the fourth vertex, and the current stage of evaluating the graph query; and
sending the merged message from the first node to the second node.

11. The one or more non-transitory computer-readable media of claim 10, wherein the instructions, when executed by the one or more processors, further causes performance of:
after generating the merged message, determining that a size of the merged message is greater than or equal to a threshold value and, in response, sending the merged message to the second node.

12. The one or more non-transitory computer-readable media of claim 10:
wherein the graph query is an aggregation query comprising a COUNT aggregation;
wherein generating the merged message comprises incrementing a COUNT value in the message.

13. The one or more non-transitory computer-readable media of claim 10:
wherein the graph query is an aggregation query comprising a MAX aggregation;
wherein generating the merged message comprises determining that the one or more second results of the first portion of the graph query comprise a first value for the MAX aggregation that is greater than a second value for the MAX aggregation from the one or more first results of the first portion of the graph query and, in response, replacing the second value in the merged message with the first value.

14. The one or more non-transitory computer-readable media of claim 10:
wherein the graph query is an aggregation query comprising a MIN aggregation;
wherein generating the merged message comprises determining that the one or more second results of the first portion of the graph query comprise a first value for the MIN aggregation that is lesser than a second value for the MIN aggregation from the one or more first results of the first portion of the graph query and, in response, replacing the second value in the merged message with the first value.

15. The one or more non-transitory computer-readable media of claim 10:
wherein the graph query is an aggregation query comprising a SUM aggregation;
wherein generating the merged message comprises adding a value for the SUM aggregation from the one or more second results of the first portion of the graph query to a value for the SUM aggregation from the one or more first results of the first portion of the graph query.

16. The one or more non-transitory computer-readable media of claim 10:
wherein the graph query is an aggregation query comprising an AVG aggregation;
wherein generating the merged message comprises:
adding a SUM value for the AVG aggregation from the one or more second results of the first portion of the graph query to a SUM value for the AVG aggregation from the one or more first results of the first portion of the graph query;
incrementing a counter for the message.

17. The one or more non-transitory computer-readable media of claim 10, wherein the one or more first results comprise identifiers of the one or more first vertices and wherein the one or more first results comprise identifiers of the one or more third vertices.

18. The one or more non-transitory computer-readable media of claim 10, wherein the instructions, when executed by the one or more processors, further causes performance of receiving, at the second node, the merged message and, in response, evaluating the next vertex with respect to the graph query.

* * * * *